US009263913B2

(12) United States Patent
    Files et al.

(10) Patent No.: US 9,263,913 B2
(45) Date of Patent: Feb. 16, 2016

(54) CONTROLLING CURRENT DRAW

(75) Inventors: Jace William Files, Garland, TX (US);
    Michael Joseph Stasaski, Keller, TX
    (US); Richard James Brogle, Irving,
    TX (US)

(73) Assignee: BlackBerry Limited, Waterloo, Ontario
    (CA)

( * ) Notice: Subject to any disclaimer, the term of this
    patent is extended or adjusted under 35
    U.S.C. 154(b) by 356 days.

(21) Appl. No.: 13/543,342

(22) Filed: Jul. 6, 2012

(65) Prior Publication Data
    US 2014/0009376 A1    Jan. 9, 2014

(51) Int. Cl.
    *G09G 5/00*     (2006.01)
    *H02J 9/00*     (2006.01)
    *H02J 7/00*     (2006.01)

(52) U.S. Cl.
    CPC ............... *H02J 9/005* (2013.01); *H02J 7/0063*
    (2013.01); *H02J 2007/0067* (2013.01)

(58) Field of Classification Search
    CPC .......... G09G 2330/021–2330/027; H02J 9/005
    USPC .................. 345/204, 211–213, 690
    See application file for complete search history.

(56) References Cited

U.S. PATENT DOCUMENTS

| 8,502,494 | B2* | 8/2013 | Nieh et al. ..................... 320/101 |
| 2007/0011473 | A1 | 1/2007 | Sung |
| 2012/0001484 | A1* | 1/2012 | Hsu .............................. 307/10.7 |
| 2013/0026833 | A1* | 1/2013 | Huang ............................ 307/48 |
| 2013/0063097 | A1* | 3/2013 | Valentine ..................... 320/136 |

FOREIGN PATENT DOCUMENTS

EP    2302706    3/2011

OTHER PUBLICATIONS

Anonymous; "Charge-Pump and Step-Up DC-DC Converter Solutions for Powering White LEDs in Series or Parallel Connections"; 12 pages; Apr. 23, 2002; Retrieved from the internet: http://www.maxim-ic.com/appnotes.cfm/appnote_number/1037/CMP/WP-33 on Jul. 4, 2007.
Extended European Search Report issued in European Application No. 12175446.9 on Nov. 14, 2012; 7 pages.

\* cited by examiner

*Primary Examiner* — Jennifer Nguyen
(74) *Attorney, Agent, or Firm* — Fish & Richardson P.C.

(57) ABSTRACT

Systems, methods, and apparatuses for controlling current in an electronic device may involve sensing a first voltage, the first voltage representing a battery voltage. The first voltage can be compared to a cutoff voltage. A current may be provided to power a display based on the comparison of the first voltage to the cutoff voltage.

17 Claims, 4 Drawing Sheets

CONTROLLING CURRENT DRAW

FIELD

The present disclosure pertains to power management in electronic devices, and, more particularly, to preventing device resets due to under voltage lockout conditions by managing power delivery to audio and display systems of electronic devices.

BACKGROUND

An electronic device can include a backlit display, which can consume a large proportion of battery power. Electronic devices may also provide audio capability, where power spikes can occur due to changes in volume.

DETAILED DESCRIPTION

Many electronic devices, including many portable electronic devices, include a portable power pack. Examples of portable electronic devices include smartphones, tablet computers, cameras, media players, navigation devices, remote controls, and the like. Some of these devices may be hand-held, that is sized and shaped to be held or carried in a human hand, or used when so held. A typical power pack may include a rechargeable battery (although a power pack may also include more batteries and one or more other energy storage elements), and generally the power pack is replenished or replaced from time to time. For purposes of simplicity, the power pack will be described as a rechargeable battery. As the battery supplies power to electronic components, the power stored in the battery becomes depleted, and typically the voltage output of the battery declines. Large power-consuming loads can cause the voltage output of the battery to decline quickly, and even though the battery voltage may rise again on its own, a sudden drop in voltage may have undesirable consequences. Due to Under-Voltage Lockout (UVLO) of Power Management Integrated Circuits (PMICs) when there is a large power draw on the main rail on a design, the operating voltage can drop below the UVLO point, which can cause a device to reset automatically. From a user's point of view, it may be as though the device stops functioning, or turns off, or turns on and off automatically. Any of these may be deemed an inconvenience.

In tablets and some larger smartphones, a display can include a backlight that can consume over 50% of the power in a normal operating mode. Additionally, in tablets there is a market desire for more numerous, larger, and louder speakers for a better multimedia experience. These speakers can generate huge current surges to produce short audio bursts. When the battery voltage is low, large current draws and larger current spikes can briefly drop the main system voltage below the UVLO threshold, which can cause the device to reset. The present application is directed to preventing this reset from occurring by quickly reducing the backlight brightness by a set amount and quickly disabling/removing power from the speaker amplifiers to reduce current surge. The threshold for reducing the backlight and disabling the speaker amps can be set in the hardware design and can be configured/fine-tuned for a specific voltage. The present application facilitates the utilization of more battery capacity while maintaining a positive user experience by the prevention (or reduction in frequency) of uncontrolled system resets.

Aspects of the present disclosure are directed to a system, apparatus, and method for controlling current draw in an electronic device for operating a display and for controlling the volume of speakers. An input voltage (V_IN) indicative of the battery voltage can be compared against a predefined cutoff voltage (V_CUTOFF). The cutoff voltage can be a voltage higher than the under voltage lockout (UVLO) voltage (V_LO). A voltage monitor can provide an output voltage (V_EN) based whether the input voltage is greater than or less then the cutoff voltage. For example, if the V_IN is greater than V_CUTOFF, then the voltage monitor can output a "high" V_EN. If V_IN is less or equal to V_CUTOFF, then the voltage monitor can output a "low" V_EN.

A high V_EN signals a current draw controller to draw more current for the display of the electronic device. A low V_EN signals the current draw controller to draw less current for the display. In certain implementations, the current draw controller includes an n-type field effect transistor (NFET). The NFET gate may be coupled to the output of the voltage monitor and can receive the V_EN voltage. The source of the NFET is held to ground. The drain of the NFET may be in series with a resistor R2. Resistor R2 may be in parallel with R1. The NFET can act as a switch: when open, current can only flow through R1 to ground; when closed, current can flow through R1 and R2 (R1∥R2). Thus, when the gate voltage (V_EN) is high, the NFET switch closes, allowing current to pass through R1 and R2 (referred to as a first circuit path or (R1∥R2)). When the gate voltage (V_EN) is low, the NFET switch opens, allowing current to pass only through R1 to ground (referred to as a second circuit path). Because R1 and R2 are in parallel, the equivalent resistance of the first circuit path (R1∥R2) is lower than that of the second circuit path (R1 only). Thus, when V_EN is high, the NFET switch is closed, and current is drawn through R1∥R2, more current is drawn than when V_EN is low, the NFET switch is open, and current is only drawn through R1. Resistors R1 and R2 share a common node, which is electronically coupled to the I_SET input of a display driver for the display. When the current draw is high, more power can be delivered to the display driver (such as a backlight controller); when the current draw is lower, less power is delivered. V_EN can be an input voltage to a transistor and be indicative of a battery voltage In addition, V_EN can signal the speakers of the electronic device to smooth out or cut off voltage spikes for audio applications. For example, the voltage spikes can be cut off to a value less than or equal to V_CUTOFF, which is less than the UVLO.

Certain aspects of the present disclosure are directed to a method for controlling current in an electronic device. The method may include sensing a first voltage, the first voltage representing a battery voltage. The first voltage can be compared to a cutoff voltage. A current can be provided to power a display based on the comparison of the first voltage to the cutoff voltage.

Certain aspects of the disclosure are directed to an apparatus for controlling current draw in an electronic device. The apparatus may include a first circuit path having a first equivalent resistance. The apparatus may also include a second circuit path having a second equivalent resistance, the second equivalent resistance greater than the first equivalent resistance. A circuit element may be configured to activate the first or second circuit path based on an input, the input representative of available battery voltage.

Aspects of the disclosure are directed to a system for controlling the current in an electronic device. The system may include a voltage monitor. The voltage monitor may be configured to sense a first voltage, the first voltage representing a battery voltage. The first voltage can be compared to a cutoff voltage. An indicator voltage representative of the outcome of the comparison of the first voltage with the cutoff voltage can be provided. The system may also include a current draw controller configured to receive the indicator voltage. The current draw controller may also be configured to draw a current to power a display based on the received indicator voltage.

In certain aspects of the implementations, providing the current to power a display may include controlling a circuit element to define a circuit, the circuit element having an on state and an off state, and the circuit having a first circuit path for the on state and a second circuit path for the off state, wherein the second circuit path has a greater equivalent resistance than the first circuit path. In certain implementations, the circuit element is a transistor, the transistor having an on state where current is passed between a source and a drain of the transistor and an off state where no current can be passed between the source and the drain. The circuit element may be in the on state when the first voltage is greater than the cutoff voltage. The circuit element may be in the off state when the first voltage is less than the cutoff voltage.

In certain implementations, controlling the circuit element to define the circuit may include providing a signal to a gate of the transistor, the transistor defining the circuit based on the signal to the gate. In certain implementations, the first circuit path may draw more current than the second circuit path.

Certain aspects of the implementations may also include controlling a speaker to decrease volume when the first voltage is less than or equal to the cutoff voltage. In certain aspects, the cutoff voltage is greater than an under voltage lockout voltage. The first voltage may be proportional to a voltage of a battery of the electronic device. Certain aspects of the implementations may include dimming the display when the first voltage is lower than the cutoff voltage.

In certain implementations, the first circuit path includes a first resistor in parallel with a second resistor, and the second circuit path includes the second resistor. In certain aspects, the input is an input voltage received from a voltage monitor, the voltage monitor configured to compare available battery voltage with a cutoff voltage, the input voltage based on the comparison of the battery voltage and the cutoff voltage.

In certain aspects, the circuit element may be configured to activate the first circuit path when the input voltage indicates that the battery voltage is above the cutoff voltage. In certain aspects of the implementations, the circuit element may be configured to activate the second circuit path when the input voltage indicates that the battery voltage is equal to or below the cutoff voltage.

In certain aspects of the implementations, the current draw controller draws a first amount of current when the indicator voltage indicates that the battery voltage is higher than a cutoff voltage and draws a second amount of current when the indicator voltage indicates that the battery voltage is lower than a cutoff voltage, the first amount of current greater than the second amount of current.

Certain aspects of the implementations may also include an audio boost enable component that receives the indicator voltage from the voltage monitor and controls power delivered to speakers based on the indicator voltage.

In certain implementations, the current draw controller may include an n-type field effect transistor (NFET) having a gate, a source, and a drain, wherein the gate receives the indicator voltage.

Figure 1A:
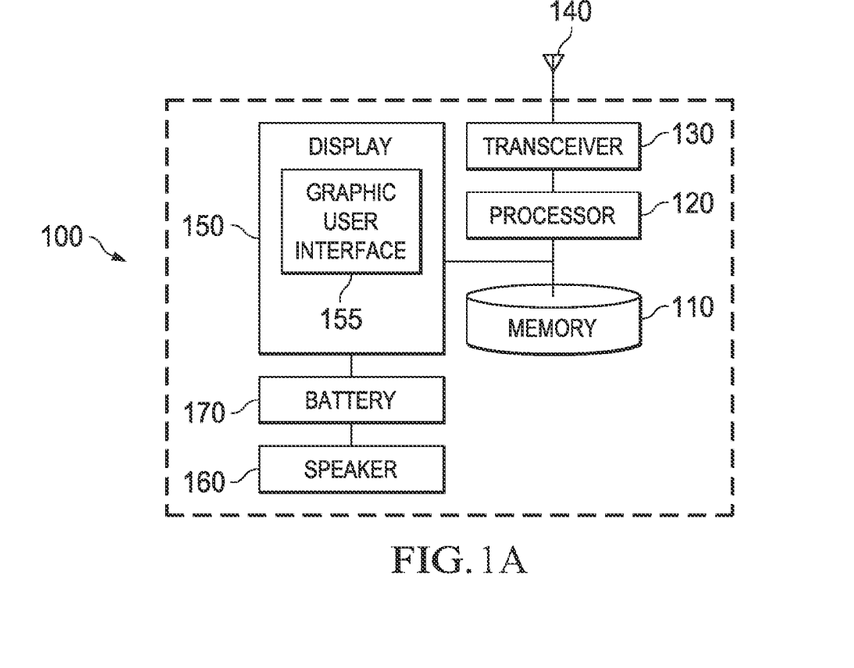
FIG. 1A is a schematic illustration of an example electronic device.

FIG. 1A is a schematic illustration of an example electronic device 100. FIG. 1A is an example electronic device 100, which can be a wireless communications device capable of communicating with a cellular network. The electronic device can be a tablet device, such as a Playbook or other tablet device, a smartphone, or other electronic device. The electronic device may include a processor 120, a memory 110, one or more speakers 160, and a display 150 capable of displaying a graphical user interface (GUI) 155. In general, display 150 emits light, usually by light emissions from individual pixels or by illumination from a general lighting element or backlight. As mentioned already, illumination of display 150 can be demanding upon the power supply for device 100. For purposes of illustration, it will be assumed that the illumination is supplied by a backlight. The electronic device may also include a battery 170 that can provide power to the electronic device. It should be understood that the electronic device 100 may include additional or different components, such as a wireless transceiver 130 and/or an antenna 140.

The processor 120 may include a microprocessor, a central processing unit, a graphic control unit, a network processor, or other processors for carrying out instructions stored in the memory 110. The functions of the processor 120 may include computation, queue management, control processing, graphic acceleration, video decoding, and execution of a sequence of stored instructions from the program kept in the memory 110. In some implementations, the processor 120 may also be responsible for signal processing including sampling, quantizing, encoding/decoding, and/or modulation/demodulation of the signal.

The memory 110 may include any memory or database module and may take the form of volatile or non-volatile memory including, without limitation, magnetic media, optical media, random access memory (RAM), read-only memory (ROM), removable media, or any other suitable local or remote memory component. The memory 110 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the wireless communication device and its personal/enterprise applications.

The wireless transceiver 130 can include both the transmitter circuitry and the receiver circuitry. The wireless transceiver 130 may be responsible for up-converting a baseband signal to a passband signal or vice versa. The components of wireless transceiver 130 may include a digital to analog converter/analog to digital converter, amplifier, frequency filter and oscillator. An antenna 140 generally comprises a transducer which can transmit and/or receive electromagnetic waves. The antenna 140 can convert electromagnetic radiation into electric current, or vice versa. The antenna 140 is generally responsible for the transmission and reception of radio waves, and can serve as the interface between the transceiver 130 and the wireless channel. In some implementations, the wireless communication device may be equipped with multiple antennas to take advantage of the multiple-input-multiple-output (MIMO) technology. The multiple antenna MIMO technology may enable the wireless communication device to set up multiple parallel data streams on the wireless channel, thereby increasing the throughput or reliability of the wireless channel. Though shown external to the device 100, the antenna 140 may be housed within the device 100.

The display 150 can be an output unit for presentation of information in visual or tactile form in response to electronic input signals. The display can be a liquid crystal display (LCD) or other type of display. In some implementations, the display 150 may include a touchscreen, which is an electronic visual display that may detect the presence and location of a touch within the display area. Touchscreen may generally refer to a display that detects a touch with a finger or hand. Touchscreens also may detect other passive objects, such as a stylus. Therefore, a display 150 that includes a touchscreen can also be used as an input unit. In some cases, the wireless communication device may also include a keypad as an input unit.

The GUI 155 may be presented on the display 150. The GUI 155 may be operable to interface with resources included in the personal perimeter and/or the enterprise perimeter. For example, the GUI 155 may generate a visual representation of applications (e.g., a web browser application). The GUI 155 may provide interface for interactions between the wireless communication device and an enterprise service. Generally, through the GUI 155, the user is provided with an efficient and user-friendly presentation of data provided by or communicated within the system. The GUI 155 may be any graphical user interface, including but not limited to, a web browser, touch screen interface, or command line interface (CLI) that processes information and presents the processing results to the user. In general, the GUI 155 may include a plurality of user interface elements, such as interactive fields, pull-down lists, and buttons operable by the user on the wireless communication device.

Electronic device 100 may include one or more speakers 160. The speakers 160 provide audio output. The audio output may be from music, recording, streaming audio/visual content, an application running on the electronic device 100, a movie, a television program, a phone or conference call, or other audio source. The speakers may provide audio output based on a predetermined volume, or the volume of the audio may be based on the amount of battery capacity remaining. The speakers 160 may be internal or external to the electronic device 100. For example, external speakers can connect to the electronic device 100, and the volume of the external speakers can be controlled through the electronic device through a hardware or a software interface.

Figure 1B:
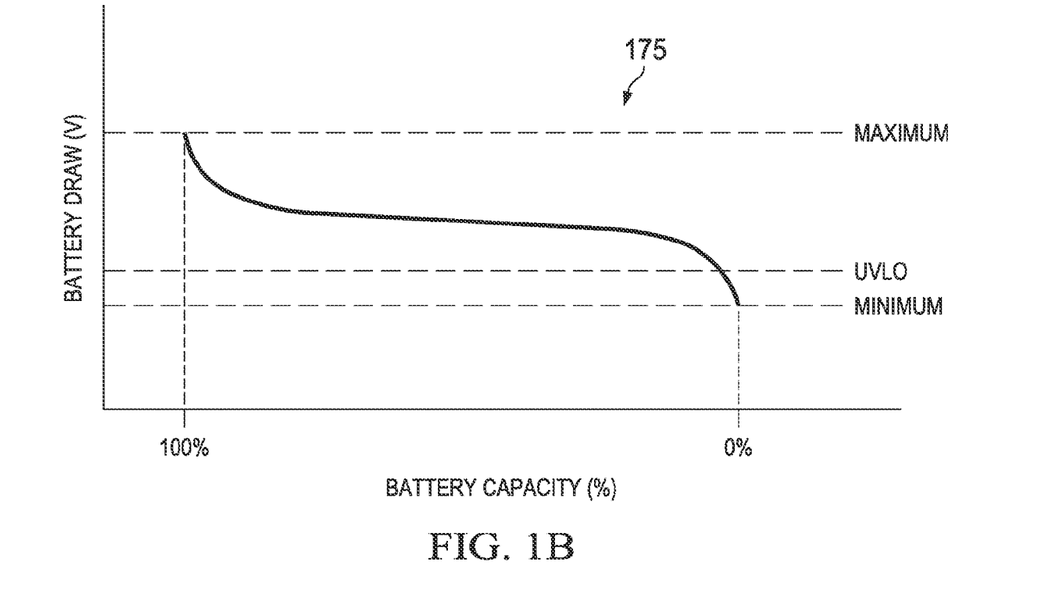
FIG. 1B is a graphical representation of an example battery profile.

Electronic device 100 includes a battery 170. Battery 170 provides power to various components of the electronic device 100, including the display 150 and the speakers 160. The battery 170 may be a lithium-ion battery or other type of battery. The battery 170 may be rechargeable through a cradle device or a USB device or by other ways. The battery 170 may have a power profile similar to that shown in FIG. 1B. FIG. 1B is a graphical representation of an example battery profile 175. The battery 170 can have a maximum capacity and a minimum capacity. The profile shown in FIG. 1B also shows a generalization of a battery draw as a percentage of battery capacity. Near the maximum voltage, the drop in voltage is steep, but levels off through the bulk of the battery capacity. As the battery 170 starts to reach its minimum capacity, the drop becomes steep again. Put differently, as the battery 170 drains and approaches empty, the battery 170 starts losing capacity faster. As such, power savings becomes increasingly important as the battery capacity diminishes, particularly when trying to avoid an uncontrolled system reset and to maintain a positive user experience.

Figure 2:
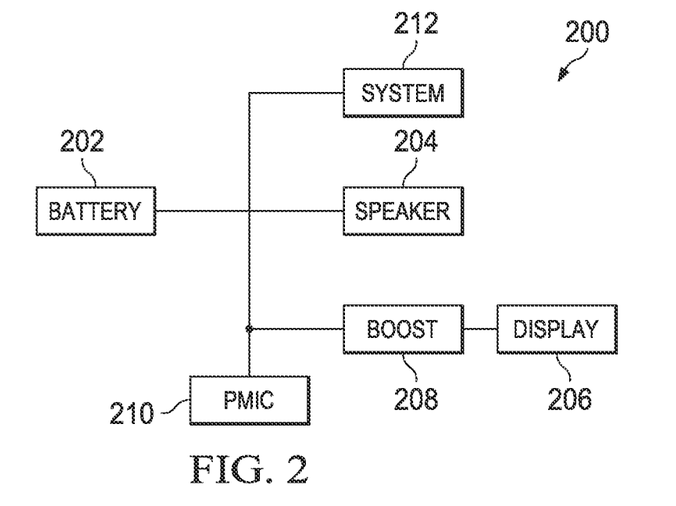
FIG. 2 is a schematic block diagram of an example power schematic for an electronic device.

FIG. 2 is a schematic block diagram of an example power schematic 200 for an electronic device. In general, the battery 202 powers the system 212, as well as the speaker 204 and the display system 206. The display system 206 may be connected to a boost circuit 208 that provides the necessary power to the display system 206. The boost circuit 208 can be connected between the battery 202 and the display system 206. A power management integrated circuit (PMIC) 210 may be connected to the battery 202. PMIC 210 may control power distribution to various system components. Noteworthy is that the speaker 204 can draw power directly from the battery 202 in certain instances, such as on high peak power draws.

Figure 3A:
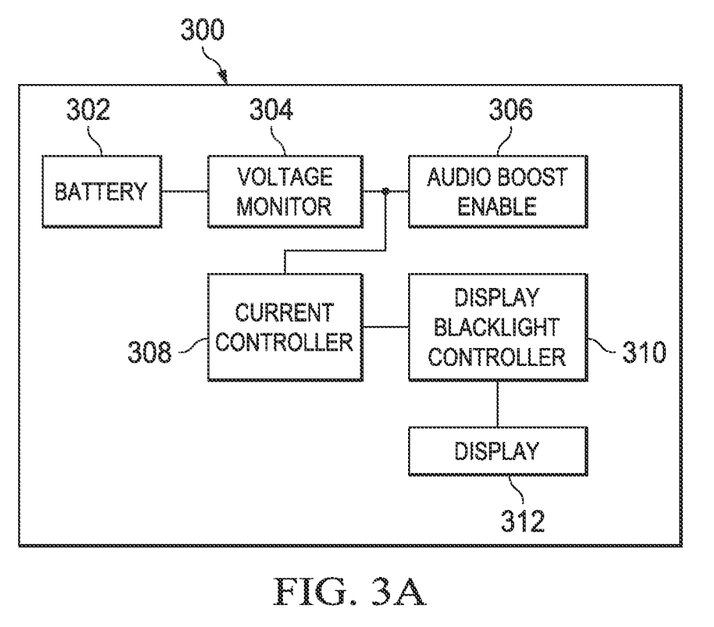
FIG. 3A is a functional block diagram for controlling current draw for audio and display systems of an electronic device.

FIG. 3A is an example of a functional block diagram 300 for controlling current draw for audio and display systems of an electronic device. Diagram 300 illustrates an example of the functional components for controlling current draw in low voltage scenarios. The diagram shows a battery 302 connected to a voltage monitor 304. The voltage monitor can be a circuit that, among other things, monitors voltage from the battery (or an indicator of the voltage from the battery, such as a value proportional to the battery output voltage). The voltage monitor 304 is connected to an audio boost enable circuit 306, which is a circuit upstream from the speakers that provides power to the speakers. A current controller 308 is also connected to the voltage monitor. The current controller 308 can control current draw for powering the speakers and the display. For example, the current controller 308 can receive an indication of a voltage from the voltage monitor 304 indicative of the battery voltage. The current controller 308 is connected to a display backlight controller 310, which is connected to the display 312 (together, the display backlight controller 310 and the display 312 may be part of the display system described above; illuminations of displays that do not include a backlight may be controlled in a comparable fashion). The display backlight controller 310 can controls power for the display. The current controller 308 can control the current draw for the backlight display controller 310.

Figure 3B:
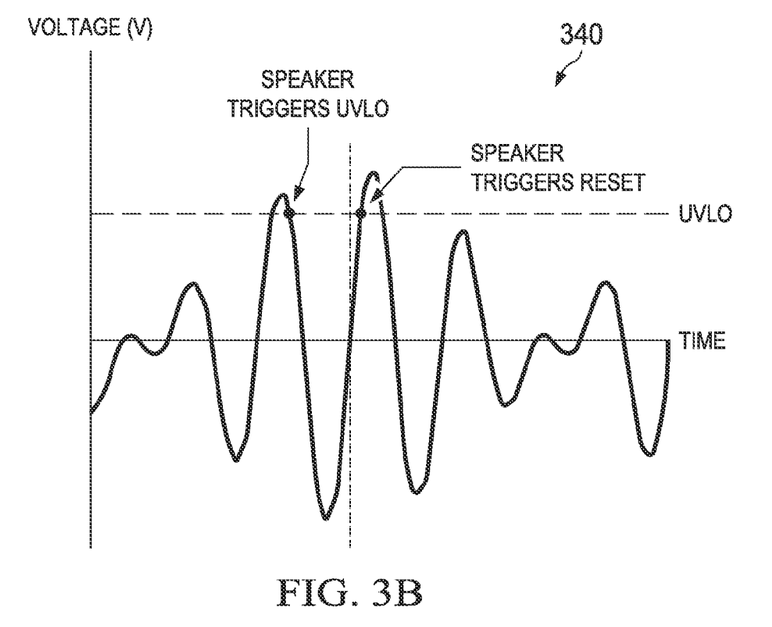
FIG. 3B is a graphical representation of a power profile of an example audio output.
Figure 3C:
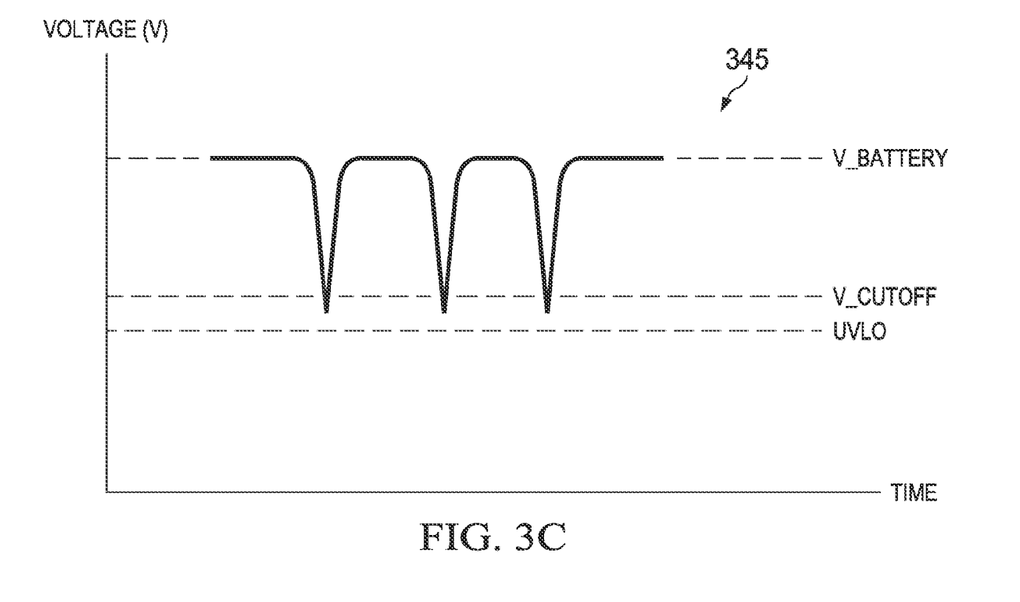
FIG. 3C is a graphical representation of a power profile of an example battery showing power draw spikes during an audio event.

As described above, for audio applications when battery capacity is running low, audio pulses can draw large currents for very short spikes, which can cause the battery voltage to briefly drop below the UVLO voltage. Large audio pulses that drop the battery voltage can cause the system to undergo an uncontrolled, abrupt or automatic reset, instead of a controlled or user-commanded reset or shutdown. This behavior is shown graphically in FIG. 3B. FIG. 3B is a graphical representation of a power profile 340 of an example audio output. The graph shows voltage usage for an audio application versus time. The curve represents an amplified audio signal used by the speakers. The UVLO line represents an example threshold for when the current draw from the audio circuit will drop the battery/system voltage below the UVLO voltage and trigger a reset. In this example, an audio signal that exceeds the UVLO threshold will trigger a UVLO and the system will stay held in reset until the power draw drops below the threshold. In certain implementations, the speaker can draw power directly from the battery or, as in this example, through an independent power supply so they can keep drawing power even though the PMIC is in UVLO. The current controller 308 can reduce audio pulse peaks to a value that will not trigger the UVLO event which will allow for a lower system voltage and thus increase the useable battery capacity and increase the units battery life. Put differently, current draw from the battery 302 can cause a sudden voltage drop to a value below the UVLO voltage. FIG. 3C is a graphical representation of a power profile 345 of an example battery showing power draw spikes during an audio event. The graph of FIG. 3C shows voltage versus time for the battery, showing the power "draw" as voltage spikes (drops) for the battery when the speakers are being pulsed with an audio signal. Here, the profile 345 only shows voltage spikes. The spikes can be leveled off to a value above the UVLO (e.g., a V_CUTOFF) to avoid approaching the UVLO. The current controller 308 can cut off or smooth out the voltage spike to a cutoff voltage, which is above UVLO. Preventing the audio voltage from dropping below the UVLO facilitates the prevention of uncontrolled resets and increases battery life. This also allows the system to stay alive with a lower battery voltage while avoiding unwanted system resets which facilitates extending the battery life of the device (i.e. the device can stay up longer without a reset). The desire to increase battery life implies that the UVLO would not be increased to avoid the reset condition.

The current controller can also dim the display backlight to draw less current as the battery voltage gets to V_CUTOFF. As previously mentioned, the display backlight can take up as much as one-half the battery power. As the battery capacity decreases, and approaches UVLO, dimming the backlight can reduce battery consumption.

Figure 3D:
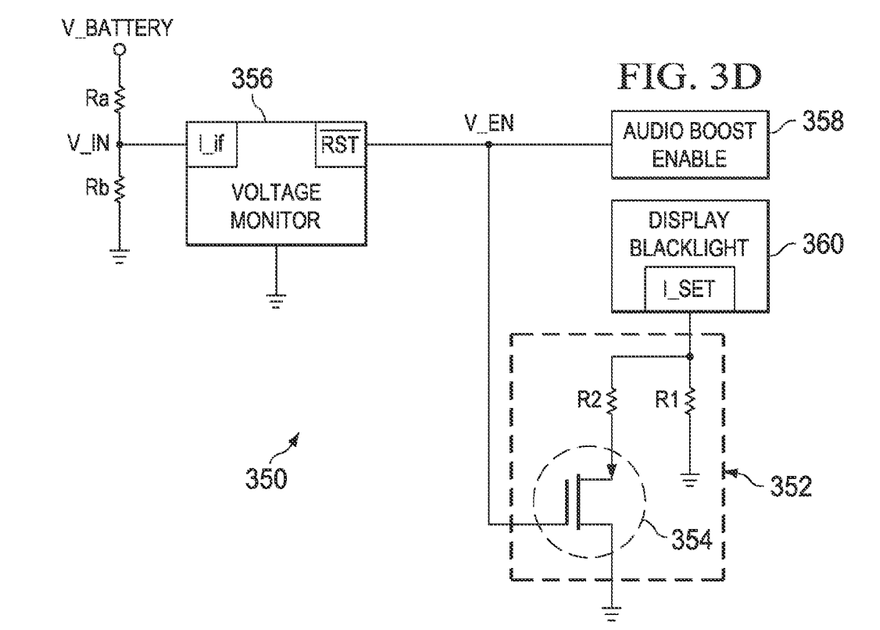
FIG. 3D is a schematic illustration of an example circuit for controlling current draw for audio and display systems of an electronic device.

FIG. 3D is a schematic illustration of an example circuit 350 for controlling current draw for audio and display systems of an electronic device. Circuit 350 includes an example implementation of a current controller 352. Current controller 352 includes a circuit element 354 that can activate or deactivate the circuit pathway that includes resistor R2. In the implementation shown in FIG. 3D, the circuit element 354 is a transistor (or more specifically, an n-type metal oxide semiconductor field effect transistor (NFET)). The circuit 350 also includes a voltage monitor 356, an audio boost enable component 358, and a display backlight 360. The voltage monitor 356 receives a voltage V_IN, which is an indication of the battery voltage (V_BATTERY) at an input I_if. Voltage V_IN can be equal to or proportional to V_BATTERY. Resistors Ra and Rb can be used to drop the battery voltage V_BATTERY to a desired level for the voltage monitor. For the input I_if, V_IN=V_CUTOFF defines the minimum activation voltage for the voltage monitor 356. The active-low reset (/RST) is enabled with a LO input and disabled with a HI input. As V_BATTERY voltage drops (due to an audio current spike or otherwise), the V_IN signal will pass thru the threshold V_CUTOFF (or a proportional equivalent) with a negative slope. When this occurs, V_EN signal will transition from a HI to a LO. When the current draw is reduced (either due to the current controller being activated or otherwise) then V_BATTERY will rise and likewise V_IN can transition to the rising V_CUTOFF voltage. The rising V_CUTOFF voltage can be equal to or slightly higher than the falling V_CUTOFF voltage to provide for hysteresis and prevent oscillations at the threshold. If V_IN is sufficiently high, V_EN has a voltage corresponding to a logical high, which can activate the circuit element 354 and permit the audio boost enable circuit to power the speakers normally. In instances where circuit element 354 is a transistor, like the NFET shown in circuit 350, the voltage V_EN is the gate voltage. A logical high gate voltage turns the transistor "ON," allowing current to pass through resistors R1 and R2. The current for I_SET can be based on the active circuit paths defined by R1 and R2 and controlled by the circuit element 354. Backlight brightness is proportional to current through I_SET. Given a set voltage, when the circuit paths include R1 and R2, more current is drawn through the current controller 352. The simple relationship defined by Ohm's law shows the behavior: I=V/R. For a set voltage, decreasing equivalent resistance increases current, where equivalent resistance here is defined by $R\_T=1/(1/R1+1/R2)$ for resistors in parallel. The value V_EN (and V_IN) can be representative of the available battery voltage.

If V_IN is sufficiently low (e.g., it is equal to V_CUTOFF), V_EN will be a voltage equivalent to a logical LO. When V_EN is a logical LO, the circuit element 354 does not allow current to pass through R2. In the example shown in FIG. 3D, when V_EN is LO, the NFET acts like an open circuit, so no current would be drawn through R2. Instead, current will flow through only R1, and this current will be less than if current flows through both R1 and R2 for a given voltage. In sum, when V_IN>V_CUTOFF, V_EN is HI, current flows through R1 and R2 to ground, and the audio boost circuit can power the speakers normally. When V_IN<V_CUTOFF, V_EN is LO, and current flows only through R1, and the audio boost circuit can power the speakers based on V_CUTOFF.

An apparatus, such as a current controller, can be configured to control the current draw in an electronic device. The current controller can include a first circuit path having a first equivalent resistance. A circuit path may be a closed loop conducting path on which current can flow. The circuit path can include circuit elements, such as resistors, capacitors, inductors, switches, transistors, diodes, and/or other circuit elements. In some implementations, the circuit path may include no circuit elements besides a conducting path that forms the closed loop. The first circuit path can include multiple pathways for current to flow—for example, circuit elements may be "in parallel." For example, the first circuit path can include a resistor R1 in parallel with a resistor R2, as well as other circuit elements. The resistors R1 and R2 in parallel may amount to an equivalent resistance. A second circuit path can include a second equivalent resistance, the second equivalent resistance greater than the first equivalent resistance. For example, the second circuit path can include resistor R1 (in this instance, R1 has a larger resistance that R1 in parallel with R2). A circuit element may be configured to activate the first or second circuit path based on an input, the input representative of available battery voltage. For example, the circuit element may be a transistor, such as an NFET.

The input may be an input voltage received from a voltage monitor. The voltage monitor may be configured to compare available battery voltage with a cutoff voltage, the input voltage based on the comparison of the battery voltage and the cutoff voltage. The circuit element may be configured to activate the first circuit path when the input voltage indicates that the battery voltage is above the cutoff voltage. The first circuit path can be activated by the closing of a switch that completes a circuit. In some instances, the circuit path can be activated by a transistor. The transistor can activate a the first circuit path when a gate voltage exceeds a threshold activation voltage for the circuit. When the gate voltage exceeds the threshold activation voltage, current can pass from one terminal of the transistor (e.g., the drain) to another (e.g., the source). The circuit can be said to be activated when current can pass through the circuit. In some instances, the circuit element can be configured to activate the second circuit path when the input voltage indicates that the battery voltage is equal to or below the cutoff voltage.

Certain aspects of the disclosure are directed to a method for controlling current in an electronic device. The method may include sensing a first voltage, the first voltage representing a battery voltage. A voltage can be "sensed" by different ways, whether actively or passively. For example, in an electric circuit, a voltage that exists on a terminal can be sensed to the extent that a voltage on a closed loop terminal can cause current to flow through the circuit. The current can be used to activate circuit elements or perform work. In some instances, a voltage may be detected by, for example, a voltage meter or other voltage detection device. For example, a voltage monitor may detect or sense a voltage on an input terminal to the voltage monitor. As described above, the voltage monitory may be any circuit that is configured to perform certain operations, including monitoring an input voltage and comparing it to other voltages. For example, the first voltage can be compared to a cutoff voltage. The cutoff voltage can be a voltage higher than the under voltage lockout (UVLO) voltage (V_LO).

A current can be provided to power a display based on the comparison of the first voltage to the cutoff voltage. Providing a current may include supplying a current or controlling an amount of current, for example, as well as other ways to establish, create, and/or direct an electrical current. In certain implementations, providing the current to power a display may include controlling a circuit element to define a circuit. Controlling the circuit element to define the circuit may include providing a signal to a gate of the transistor, the transistor defining the circuit based on the signal to the gate. The signal may be a voltage or other signal that can cause a current to pass from a first terminal of the transistor (e.g., a drain) to a second terminal of the transistor (e.g., the source).

The circuit element may have an on state and an off state. For example, in certain situations, the circuit element may be off, and no current passes across it or through it. In the on state, the circuit element may pass current. Examples of a circuit element include a switch, a transistor, a relay, or other similar device. The circuit may include a first circuit path and a second circuit path. When the circuit element is in the on state, the first circuit path may be established (or defined). When the circuit element is in the off state, the second circuit path may be established (or defined). The second circuit path may have a greater equivalent resistance than the first circuit path. For example, the second circuit path may include a resistor R1 and the first circuit path may include a resistor R1 in parallel with a resistor R2. In certain instances, the first circuit path can draw more current than the second circuit path. In some implementations, the circuit element may be in the on state when the first voltage is greater than the cutoff voltage. In some implementations, the circuit element may be in the off state when the first voltage is less than the cutoff voltage.

Certain aspects of the implementations may include controlling a speaker to decrease volume when the first voltage is less than or equal to the cutoff voltage. Controlling a speaker may include controlling the amount of current or voltage that is provided to (or applied to or directed to, etc.) the speaker so that the speaker outputs a desired volume. The speaker volume can be decreased by decreasing the amount of current provided to the speaker, which can save current draw when battery levels are low. In certain instances, the cutoff voltage may be greater than an under voltage lockout voltage. In some instances, the first voltage is proportional to a voltage of a battery of the electronic device. The first voltage may be a function of the voltage of the battery, including a proportion, an identity, or other function, such that the first voltage is representative of the battery voltage and the battery voltage can be extrapolated or otherwise identified from the first voltage.

Certain aspects of the implementations may include dimming the display when the first voltage is lower than the cutoff voltage. The display may be dimmed by reducing the power available for the display. For example, a current available for the display may be reduced, for example, by defining a circuit path that controls the amount of current available for the display. The circuit may be defined by the activation (or deactivation) of a circuit element, such that the equivalent resistance of the circuit is controlled. The equivalent resistance of the circuit can control the amount of current in the circuit for a given voltage.

Figure 4:
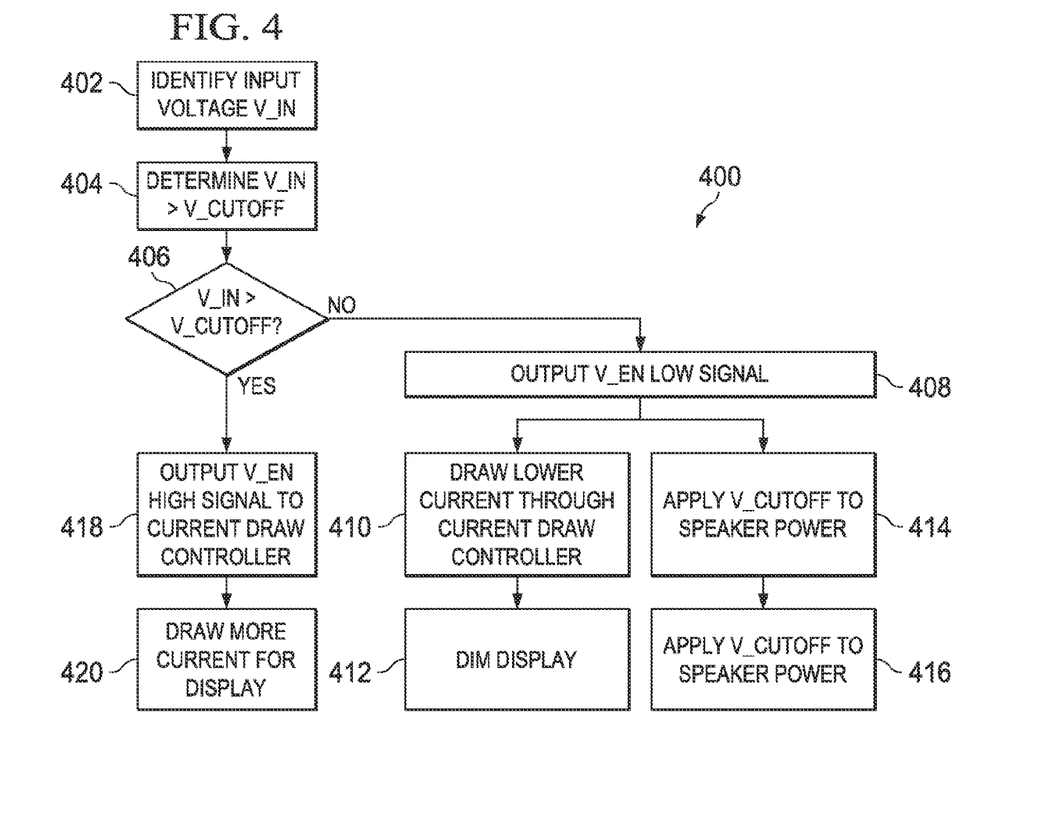
FIG. 4 is a process flow diagram for controlling current draw in an electronic device.

FIG. 4 is a process flow diagram 400 for controlling current draw in an electronic device. A input voltage can be sensed (402). The input voltage can be sensed at a terminal electrically coupled to a battery, and in certain implementations, the terminal is coupled to the battery across one or more circuit elements, such as a resistor. The input voltage (V_IN) can be indicative of the battery voltage available. In certain implementations, a resistor or other resistive circuit element can be connected between the input voltage terminal and a voltage ground. The term "sensed" in this case can include any way of detecting a voltage on the input voltage terminal. For example, in electronic circuits the presence of a voltage can, in and of itself, cause other circuit elements to react. For example, the presence of a voltage and a resistance can cause a current to flow—the voltage can be sensed to the extent that its presence causes the current to flow. Other terms can be used, such as received, detected, determined, etc., without deviating from the concept of a voltage being present at a terminal. Other concepts are also contemplated, however. For example, a switch or other equivalent circuit element can be used to communicate voltage information from one terminal to another.

It can be determined how V_IN compares to a predetermined cutoff voltage (V_CUTOFF) (404). This determination can be made by a circuit element, such as an integrated circuit acting as a circuit monitor, or by a transistor circuit, or other equivalent circuit element. If V_IN is greater than a threshold value, V_CUTOFF, (406), an output voltage (V_EN) signals to a current draw controller to draw more current for powering a display backlight, display driver, or other component for driving the display of the electronic device (418). The signal can be a voltage value, such as a voltage high enough to trigger the desired response from the current draw controller. In some implementations, the signal can be a binary hi or lo signal, or other equivalent signal. The signal can be provided from an output of a voltage monitor or other equivalent circuit element. In certain implementations, a high V_EN can be received at a gate of a transistor, such as an NFET. For instances when V_IN is greater than V_CUTOFF, V_EN would be greater than the threshold voltage V_TH for activating the NFET. Thus, V_EN high activates an NFET, causing current to be drawn through two parallel resistors connected to the I_SET input of the display diver, thereby drawing more current for the display. The display driver can draw more current and operate with a higher level of brightness (420). In certain implementations, resistors R1 and R2 can be connected in parallel to each other, having a common node at I_SET. The NFET can be electrically coupled to one of the resistors (say, R2). When the NFET is activated (i.e., V_EN>V_TH), current is drawn through both resisters R1 and R2. When the NFET is not activated (i.e., V_TH>V_EN), current is drawn through R1. More current is drawn through R1 and R2 in parallel than when current is only drawn through R1 based on Ohm's Law. V_EN>V_TH can also allow the audio boost enable circuit to continue to provide volume to the speakers without triggering the UVLO and/or reset.

If V_IN is less than or equal to V_CUTOFF, V_EN signals to the current draw controller to draw less current for powering the display driver (408). In certain implementations, for V_IN less than V_CUTOFF, a low V_EN can be received at a gate of an NFET. V_EN would be less than the threshold voltage V_TH for activating the NFET. Thus, V_EN low does not activate the NFET, causing current to be drawn through only one of the resistors connected to the I_SET input of the display diver, thereby drawing less current for the display. The current draw controller can draw less current (410) for the display driver, which can dim the display (412). In addition, the V_EN signals to the speakers to cutoff voltage spikes to a value less than or equal to V_CUTOFF (414), which is less than the under voltage lockout (UVLO) voltage (416). The speakers can operate at a lower volume.

Implementation of one or more techniques and variations may realize one or more benefits, some of which have already been described or suggested. In many cases, the inconvenience of an uncontrolled, abrupt or automatic reset can be avoided or delayed, and the user experience with using the device can be enhanced. Further, the techniques can be adapted for use with a variety of electronic devices with a variety of loads. The physical components that implement the techniques can be small, have little or negligible effect upon the size or weight of the device (considerations of size and weight are of greater importance when the device is handheld). Many of the techniques can be implemented automatically, without command or intervention of a user.

A several implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Certain advantages include the reduction in the number of uncontrolled resets of the device. The additional circuit components involved may be minimal, making implementation of the power control systems such as those described herein less costly and without undue redesigning of the control elements or the system at large.

Other implementations fall within the scope of the following claims.

What is claimed is:

1. A method for controlling current in an electronic device, the method comprising:
    sensing a first voltage, the first voltage representing a voltage output of a battery;
    determining the first voltage is equal to or lower than a cutoff voltage; and
    in response to the determining and while powering a display using the battery, decreasing a current drawn from the battery until at least the first voltage is equal to or greater than the cutoff voltage, wherein decreasing the current to power a display comprises controlling a circuit element to define a circuit between the battery and the display, the circuit element having an on state and an off state, and the circuit having a first circuit path for the on state and a second circuit path for the off state, wherein the second circuit path has a greater equivalent resistance than the first circuit path.

2. The method of claim 1, wherein the circuit element is in the on state when the first voltage is greater than the cutoff voltage.

3. The method of claim 1, wherein the circuit element is in the off state when the first voltage is less than the cutoff voltage.

4. The method of claim 1, wherein the circuit element is a transistor.

5. The method of claim 1, wherein controlling the circuit element to define the circuit comprises providing a signal to a gate of a transistor, the transistor defining the circuit based on the signal to the gate.

6. The method of claim 1, wherein the first circuit path draws more current than the second circuit path.

7. The method of claim 1, further comprising controlling a speaker to decrease volume when the first voltage is less than or equal to the cutoff voltage.

8. The method of claim 1, wherein the cutoff voltage is greater than an under voltage lockout voltage.

9. The method of claim 1, wherein the first voltage is proportional to a voltage of a battery of the electronic device.

10. An apparatus for controlling current draw in an electronic device, the apparatus comprising:
    a first circuit path having a first equivalent resistance and configured to connect a battery to;
    a second circuit path having a second equivalent resistance, the second equivalent resistance greater than the first equivalent resistance; and
    a circuit element configured to switch, in response to a voltage of a battery being equal to or lower than a cutoff voltage, from the first circuit path to the second circuit path until at least battery voltage is equal to or greater than the cutoff voltage, wherein the first circuit path and the second circuit path connect, when switched on, the battery to a display.

11. The apparatus of claim 10, wherein the circuit element is a transistor.

12. The apparatus of claim 10, wherein the first circuit path includes a first resistor in parallel with a second resistor, and the second circuit path includes the second resistor.

13. The apparatus of claim 10, wherein the input is an input voltage received from a voltage monitor, the voltage monitor configured to compare available battery voltage with the cutoff voltage, the input voltage based on the comparison of the battery voltage and the cutoff voltage.

14. The apparatus of claim 13, wherein the circuit element is configured to activate the first circuit path when the input voltage indicates that the battery voltage is above the cutoff voltage.

15. A system for controlling a current in an electronic device, the system comprising:
   a voltage monitor configured to:
      sensing a first voltage, the first voltage representing a voltage output of a battery,
      determining the first voltage is equal to or lower than a cutoff voltage, and
      providing an indicator voltage representative of the outcome of the determination of the first voltage with the cutoff voltage; and
   a current draw controller configured to:
      receive the indicator voltage, and
      in response to the indicator voltage and while powering a display using the battery, reduce a current drawn from the battery until at least the first voltage is equal to or greater than the cutoff, wherein the current draw controller comprises an n-type field effect transistor (NFET) having a gate, a source, and a drain, wherein the gate receives the indicator voltage.

16. The system of claim 15, wherein the current draw controller draws a first amount of current when the indicator voltage indicates that the battery voltage is higher than a cutoff voltage and draws a second amount of current when the indicator voltage indicates that the battery voltage is lower than a cutoff voltage, the first amount of current greater than the second amount of current.

17. The system of claim 15, further comprising an audio boost enable component that receives the indicator voltage from the voltage monitor and controls power delivered to speakers based on the indicator voltage.

* * * * *

UNITED STATES PATENT AND TRADEMARK OFFICE
CERTIFICATE OF CORRECTION

| | | |
|---|---|---|
| PATENT NO. | : 9,263,913 B2 | Page 1 of 1 |
| APPLICATION NO. | : 13/543342 | |
| DATED | : February 16, 2016 | |
| INVENTOR(S) | : Jace William Files, Michael Joseph Stasaski and Richard James Brogle | |

It is certified that error appears in the above-identified patent and that said Letters Patent is hereby corrected as shown below:

In the claims

In Column 12, In Line 61, In Claim 10, after "battery to", insert -- the first circuit path --, therefor.

Signed and Sealed this
Tenth Day of May, 2016

Michelle K. Lee
*Director of the United States Patent and Trademark Office*